(12) United States Patent
Li et al.

(10) Patent No.: US 11,686,851 B2
(45) Date of Patent: Jun. 27, 2023

(54) INTEGRITY MONITORING METHOD OF IONOSPHERE GRADIENT BASED ON KINEMATICAL TO KINEMATICAL PLATFORM

(71) Applicant: Harbin Engineering University, Heilongjiang (CN)

(72) Inventors: Liang Li, Heilongjiang (CN); Ruijie Li, Heilongjiang (CN); Jiaxiang Li, Heilongjiang (CN); Jiachang Jiang, Heilongjiang (CN); Chun Jia, Heilongjiang (CN); Hui Li, Heilongjiang (CN); Yang Li, Heilongjiang (CN); Zhibo Na, Heilongjiang (CN)

(73) Assignee: Harbin Engineering University, Harbin (CN)

( * ) Notice: Subject to any disclaimer, the term of this patent is extended or adjusted under 35 U.S.C. 154(b) by 341 days.

(21) Appl. No.: 17/013,743

(22) Filed: Sep. 7, 2020

(65) Prior Publication Data
US 2021/0293968 A1 Sep. 23, 2021

(30) Foreign Application Priority Data
Mar. 21, 2020 (CN) .......................... 202010204109.2

(51) Int. Cl.
*G01S 19/08* (2010.01)
*G01S 19/07* (2010.01)
*G01S 19/43* (2010.01)

(52) U.S. Cl.
CPC ............ *G01S 19/08* (2013.01); *G01S 19/072* (2019.08); *G01S 19/43* (2013.01)

(58) Field of Classification Search
CPC ......... G01S 19/08; G01S 19/072; G01S 19/43
See application file for complete search history.

(56) References Cited

U.S. PATENT DOCUMENTS

| 8,094,064 B2 * | 1/2012 | Brenner | G01S 19/08 |
| | | | 342/357.26 |
| 2019/0361129 A1 * | 11/2019 | Pedersen Topland | |
| | | | G01S 19/074 |

FOREIGN PATENT DOCUMENTS

CA 2682210 A1 * 9/2008 ............. G01S 19/44

OTHER PUBLICATIONS

Giorgi, Gabriele, "On Ionosphere-induced Error Detection for GNSS Integrity Monitoring", IEEEAC Paper#2219, Oct. 18, 2013 (Year: 2013).*

* cited by examiner

*Primary Examiner* — Cassi J Galt

(57) ABSTRACT

The present disclosure provides an integrity monitoring method of ionosphere gradient based on kinematical to kinematical platform, comprising step 1, constructing geometry-free and ionospheric amplification type detection statistics, based on original triple-frequency carrier phase observations, step 2, adjusting a detection threshold based on a required monitoring false alarm rate, and determining whether the detection statistics are less than the adjusted detection threshold, step 3, comparing a calculated miss-detection rate and a required miss-detection rate, and determining whether the calculated miss-detection rate are less than the required miss-detection rate, and step 4, if the detection statistics are less than the adjusted detection threshold and the calculated miss-detection rate are less than the required miss-detection rate, considering the ionosphere gradient is normal.

3 Claims, 3 Drawing Sheets

INTEGRITY MONITORING METHOD OF IONOSPHERE GRADIENT BASED ON KINEMATICAL TO KINEMATICAL PLATFORM

CROSS-REFERENCE TO RELATED PATENT APPLICATION

This application claims priority to and the benefit of CN 202010204109.2, filed Mar. 21, 2020. The entire disclosure of the above-identified application is incorporated herein by reference.

FIELD

The present disclosure relates to the technical field of an autonomous monitoring of signal-in-space anomalies, and specifically to an integrity monitoring method of an ionosphere gradient based on kinematical to kinematical platform.

BACKGROUND

The ionosphere gradient anomalies are main risk resources that are considered when a signal-in-space quality is monitored. The change of the ionosphere is closely related to the intensity of solar activity, the magnetic latitude, and the local time, etc. It is difficult to eliminate, by an accurate model, the errors of the precision positioning due to the ionosphere change. Therefore, only the monitoring way can be used to detect and exclude the impact of the ionosphere gradient anomalies to the signal-in-space quality.

The application scenarios without the precise reference base-stations have been increasing. The application scenarios are, for example, the applications of the vehicle formation travel, the applications of the cooperative operation of agricultural machinery, and the applications of the UAV formation flight, etc. The conventional GBAS ionosphere gradient integrity monitoring can realize the decoupling of the ionosphere gradient anomalies, but the precise reference base-stations are needed to assist the monitoring. On the basis of the decoupling, the monitoring is made for the ionosphere gradient integrity. The conventional GBAS ionosphere gradient integrity monitoring is difficult to function without the precise reference base-stations.

Therefore, in the present technical field, it is needed to provide a method of the ionosphere gradient integrity monitoring based on kinematical to kinematical platform.

SUMMARY

Generally, there is a mutual restriction between the monitoring sensitivity and the smoothing time in the conventional ionosphere gradient integrity monitoring, and there is no the reference base-stations in a kinematical to kinematical mode.

The present disclosure provides a monitoring method of the ionosphere gradient integrity. The method can adapt to the demands of applications of not having precise reference base-stations. The method is also able to satisfy the technical requirements of the ionosphere gradient monitoring sensitivity from the high-accuracy relative positioning. The method is a key to achieve the ionosphere gradient integrity monitoring in a kinematical to kinematical mode.

The present disclosure constructs a geometry-free and ionospheric amplification type detection statistics based on the BDS (BeiDou Navigation Satellite System) triple-frequency observations, realizes the decoupling monitoring of the ionosphere gradient anomalies, and improves synchronously the initialization time and the detection sensitivity of the autonomous monitoring of the ionosphere gradient anomalies.

The method may include the following steps.

Step 1: constructing geometry-free and ionospheric amplification type detection statistics based on original triple-frequency carrier phase observations.

Step 2: adjusting a detection threshold based on a required monitoring false alarm rate, to restrain errors of the false alarm.

Step 3: comparing a calculated miss-detection rate and a required miss-detection rate, to restrain a miss-detection error.

Step 4: determining that the ionosphere gradient is normal when the two restraints are satisfied, and then entering a next monitoring process.

The benefits of the present disclosure are as follows.

The ionosphere gradient abnormities are main risk resources that are considered when a signal-in-space quality is monitored. When facing the problem of the loss of the precise base-stations due to the kinematical to kinematical application environment, the present disclosure constructs geometry-free and ionospheric amplification type detection statistics using BDS triple-frequency observations, realizes the decoupling monitoring of the ionosphere gradient anomalies under the dual restraints of the integrity and the continuity of the monitoring performance, and improves synchronously the initialization time and the detection sensitivity of the autonomous monitoring of the ionosphere gradient anomalies.

The present disclosure provides an integrity monitoring apparatus of ionosphere gradient based on kinematical to kinematical platform, comprising a receiver for receiving the BDS triple-frequency observations, and a processing system for receiving the observations and processing to monitor the integrity of the ionosphere gradient.

The processing system comprises a resolving component, a constructing component, an adjusting component, a first comparing component, a calculating component, a second comparing component, a determining component, and an alarming component. The resolving component resolves a whole-cycle ambiguity using a geometry-free and ionosphere-free combination of multiple frequencies. The constructing component is used to construct geometry-free and ionospheric amplification type detection statistics. The adjusting component is used to adjust a detection threshold based on a required monitoring false alarm rate. The first comparing component compares the detection statistics and the detection threshold, if the detection statistics is more than the detection threshold, the alarming component issues an alarm, if not, the calculating component calculates a miss-detection rate of the ionosphere gradient of 300 mm/km. The second comparing component compares the calculated miss-detection rate and a required miss-detection rate, if the calculated miss-detection rate is more than a required miss-detection rate, the alarming component issues alarm, if not, the determining component determines that the ionosphere gradient is normal.

DETAILED DESCRIPTION

The method of the present disclosure constructs geometry-free and ionospheric amplification type detection statistics using the combination of the BDS triple-frequency observations, to realize the decoupling monitoring of the ionosphere gradient anomalies. The present disclosure can improve synchronously the initialization time and the detection sensitivity of the autonomous monitoring of the ionosphere gradient anomalies.

The present disclosure will be explained with reference to the drawings.

Figure 1:
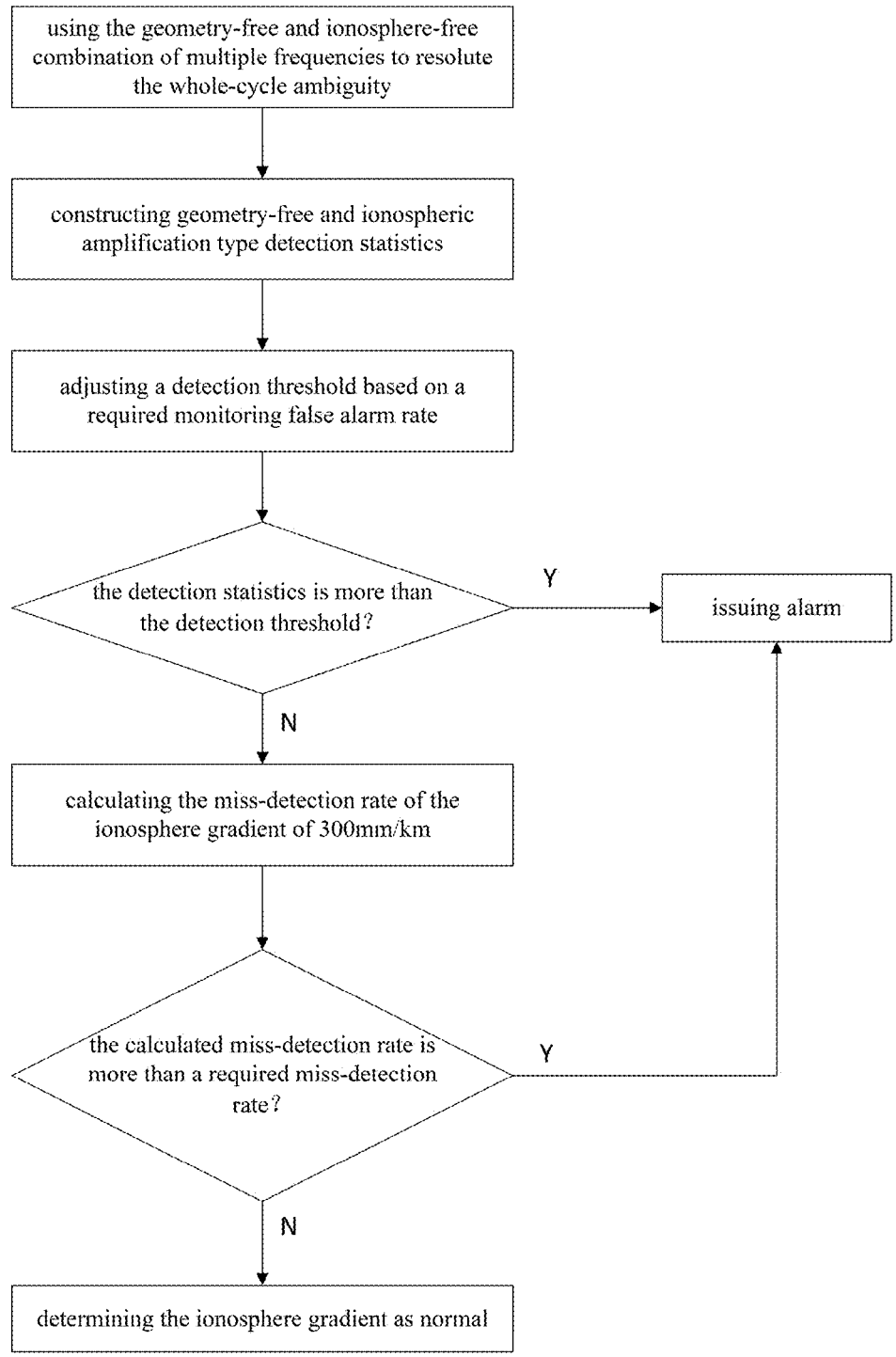
FIG. 1 shows the flow chart of the integrity monitoring method of an ionosphere gradient based on kinematical to kinematical platform according to the present disclosure.

FIG. 1 shows the flow chart of the integrity monitoring method of the ionosphere gradient based on the kinematical to kinematical platform according to the present disclosure.

The method of the present disclosure includes the following steps.

Step 1: constructing geometry-free and ionospheric amplification type detection statistics.

Firstly, the combination of the BDS triple-frequency observations may be used to construct the geometry-free and ionospheric amplification type detection statistics. By this, the effect of no reference base-stations and the effect of the geometry-dependent risk source can be eliminated.

$$q^{i,j} = \sum_{f=1}^{3} \alpha_f \Delta \nabla \phi_f^{i,j} = \sum_{f=1}^{3} \lambda_f \alpha_f \Delta \nabla N_f^{i,j} + \sum_{f=1}^{3} \mu_f \alpha_f \Delta \nabla I_1^{i,j} + \varepsilon, \quad (1)$$

$$\text{s.t. } \sum_{f=1}^{3} \alpha_f = 0, \max \sum_{f=1}^{3} |\mu_f \alpha_f|, \min\left(\sum_{f=1}^{3} \alpha_f^2\right)$$

In the equation (1), q represents the detection statistics, $\Delta\nabla\phi$ represents double-difference carrier-phase observations, $\alpha$ represents a combination coefficient, $\lambda$ represents a wavelength, $\mu$ represents a ionospheric scale factor, $\Delta\nabla N$ represents a whole-cycle ambiguity, $\Delta\nabla I$ 1 represents a double-difference ionospheric residual on the frequency point of the BeiDou B1, $\varepsilon$ represents an observation noise, f represents a frequency point of the BDS, and i and j represent corresponding satellites.

The selection of the combination coefficient should satisfy the following constraints:

1): the geometry-free combination $$\sum_{f=1}^{3} \alpha_f = 0;$$

2): the delay coefficient of the ionosphere reaches the maximum value to improve the detection sensitivity of the ionosphere gradient anomalies; and 3): the noise amplification coefficient is small enough to minimize the demand for the initialization time.

The correct fixation of the whole-cycle ambiguity is a premise of achieving the efficient monitoring of the ionosphere gradient. When the ionospheric activity is normal, the effect will not occur to the whole-cycle ambiguity of the short baseline condition. When the ionospheric activity is abnormal, the double-difference carrier-phase residual will far exceed the wavelength, which will result in the fixation failure of the whole-cycle ambiguity. In order to avoid that the coupling of the ionosphere gradient anomalies affects the resolution method of the whole-cycle ambiguity, the ionosphere gradient monitoring method of the present disclosure may use the geometry-free and ionosphere-free combination to resolve the whole-cycle ambiguity.

Step 2: adjusting a detection threshold based on a required monitoring false alarm rate, to restrain the error of the false alarm.

Although the use of the geometry-free and ionosphere-free combination can avoid the impact of the ionosphere gradient anomalies to the resolution of the whole-cycle ambiguity, the resolution of the whole-cycle ambiguity has a random property. The deviation of the detection statistics will be generated due to the erroneous resolution of the whole-cycle ambiguity, and the integrity monitoring of the ionosphere gradient anomalies will be affected. On the basis of the error propagation rules of the three-frequency combined geometry-free model, according to the statistical distribution characteristics followed by the detection statistics in states having the failure of the resolution of the whole-cycle ambiguity of or not and having the ionosphere gradient anomalies or not, the constraint of the errors of the false alarm of the monitoring method in different failure modes of the resolution of the whole-cycle ambiguity is constructed as follows.

$$P_{FA} = P\{|q| > T|H_0, CF\}P\{CF\} + \sum_{i=1}^{N_{fa}} P\{|q| > T|H_0, IF_i\}P\{IF_i\} \quad (2)$$

In the equation (2), PFA represents the requirements for the false alarm rate, T represents a detection threshold, H0 represents that the satellites are in a normal state, CF represents that the resolution of ambiguity is correct, IFi represents the resolution of ambiguity deviates±i cycles from a true value, and Nfa is the failure modes of the resolution of the whole-cycle ambiguity that are obtained based on the requirements of the calculation accuracy of the false alarm rate.

The requirements for the false alarm rate may be obtained from the Markov Model, the required detection threshold T may be calculated out from the equation (2), and the distribution table of the detection threshold which is related to a movement smoothing length and the false alarm rate may be formed by traversing the movement smoothing length and the requirements of the false alarm rate. In the actual use, the detection threshold T may be selected based on the selected movement smoothing length and the required false alarm performance. By comparing the detection statistics q and the detection threshold T, the errors of the false alarm of the integrity monitoring of the ionosphere gradient anomaly may be restrained. When the detection statistics of some pair of satellites exceed the detection threshold T, the monitoring of the ionosphere gradient anomaly should alarm promptly, and the non-reference satellite of this pair of satellites marked as the abnormal state of the ionosphere gradient.

Step 3: Comparing a calculated miss-detection rate and a required miss-detection rate, to restrain a miss-detection error.

When all detection statistics are within the protection level of the detection threshold T, the effect of the resolution failure of the whole-cycle ambiguity should be taken into account. The miss-detection rate may be calculated based on the worst-case protection rules.

$$P_{md} = P\{|q| < T|H_1, CF\}P\{CF\} + \sum_{i=1}^{N_{md}} P\{|q| < T|H_1, IF_i\}P\{IF_i\} \quad (3)$$

In the equation (3), H1 represents that the satellites are in an abnormal state, Nmd is the considered failure modes of the resolution of the whole-cycle ambiguity that are obtained based on the requirements of the calculation accuracy of the miss-detection rate.

Using the geometry-free detection statistics and the detection threshold, and the required miss-detection rate obtained from the Markov Model and the calculated miss-detection rate from the equation (3), the present disclosure can realize the autonomous monitoring of the ionosphere gradient anomaly.

Figure 2:
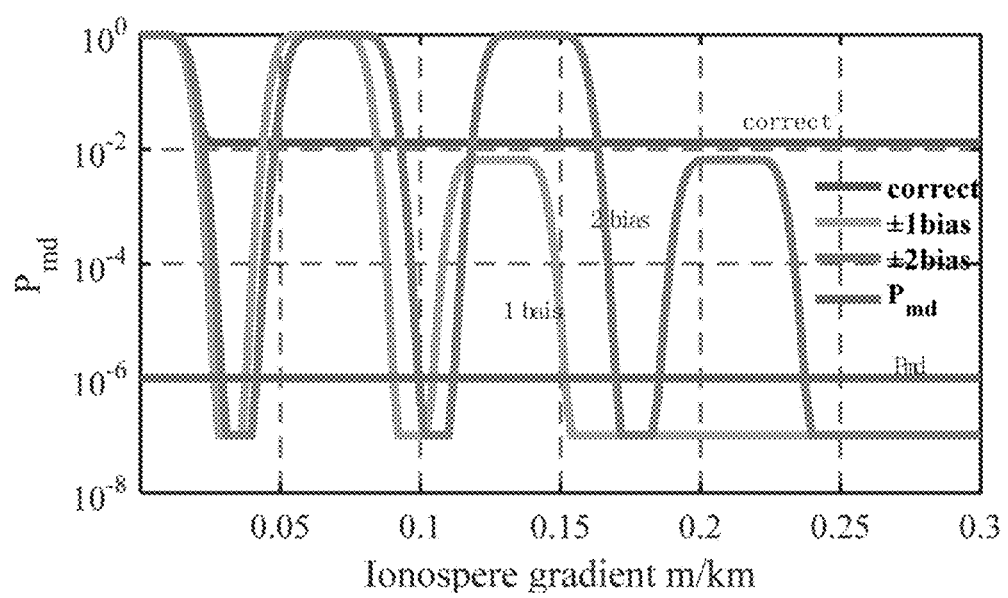
FIG. 2 shows the diagram of the miss-detection rate in the case that the ambiguity is fixed and the true value is deviated 1 cycle and 2 cycles.

FIG. 2 shows the curves of the miss-detection performance of the monitoring method of the ionosphere gradient in different failure modes of ambiguity fixation, based on BDS carrier-phase observations without the reference base station. In FIG. 2, the initialization time is selected as 150 epochs, and the length of the baseline is selected as 5 km.

With reference to FIG. 2, the consideration of the failure modes of the ambiguity fixation is helpful to improve the monitoring performance of the integrity of ionosphere gradient. In the actual application, it is needed to consider the failure modes of the ambiguity fixation and the relationship between the initialization time and the monitoring sensitivity, and thus the monitoring technology of the ionosphere gradient anomaly without the reference base station can be optimized.

Step 4: after satisfying the two restraints (as shown in FIG. 1, the detection statistics is less than the detection threshold, and the calculated miss-detection rate is less than a required miss-detection rate), the ionosphere gradient is considered as normal, and the Integrity monitoring method of ionosphere gradient based on kinematical to kinematical platform is finished. Then the next monitoring process is started.

In conclusion, as shown in FIG. 1, the method includes:

1) using the geometry-free and ionosphere-free combination of multiple frequencies to resolve the whole-cycle ambiguity;

2) constructing geometry-free and ionospheric amplification type detection statistics;

3) adjusting a detection threshold based on a required monitoring false alarm rate;

4) comparing the detection statistics and the detection threshold; if the detection statistics is more than the detection threshold, then issuing alarm, if not, then 5) calculating the miss-detection rate of the ionosphere gradient of 300 mm/km;

6) comparing the calculated miss-detection rate and a required miss-detection rate, if the calculated miss-detection rate is more than a required miss-detection rate, then issuing alarm, if not, then 7) determining the ionosphere gradient as normal.

Figure 3:
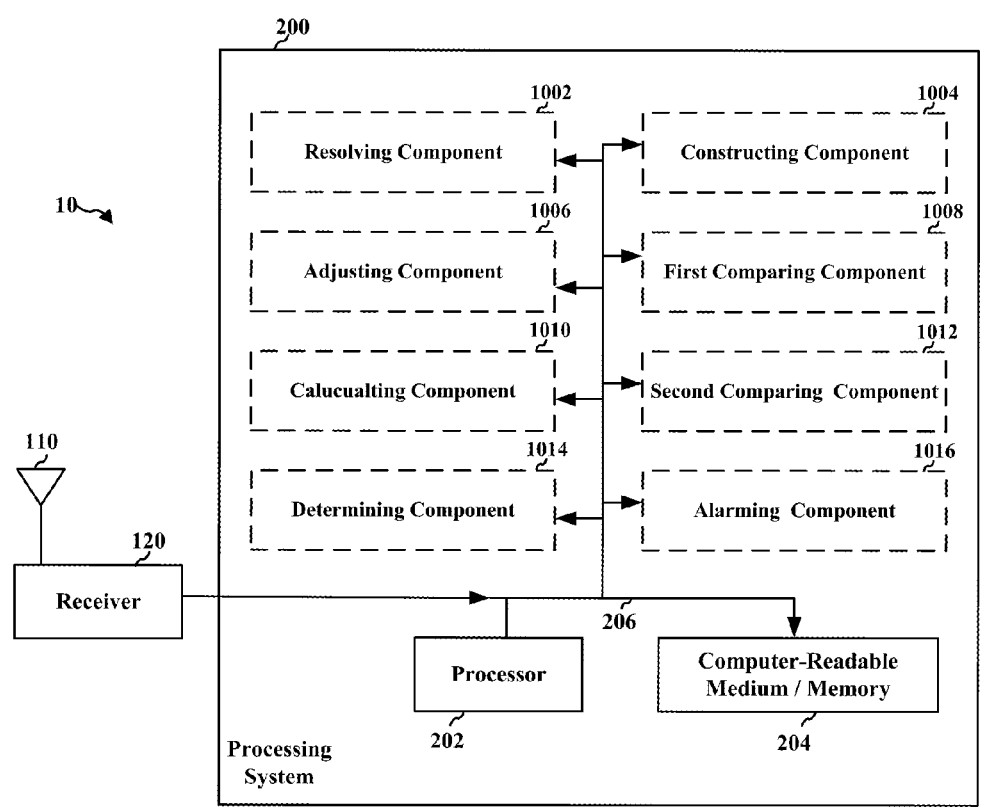
FIG. 3 shows an exemplary integrity monitoring apparatus of ionosphere gradient based on kinematical to kinematical platform

FIG. 3 shows an exemplary integrity monitoring apparatus of ionosphere gradient based on kinematical to kinematical platform. The apparatus 10 may include a receiver 120, and a processing system 200.

The apparatus may include additional components that perform each of the blocks of the algorithm in the aforementioned flowchart of FIG. 1. As such, each block in the aforementioned flowchart of FIG. 1 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The processing system 200 may be implemented with a bus architecture, represented generally by the bus 206. The bus 206 may include any number of interconnecting buses and bridges depending on the specific application of the processing system 200 and the overall design constraints. The bus 206 links together various circuits including one or more processors and/or hardware components, represented by the processor 202, the components 1002, 1004, 1006, 1008, 1010, 1012, 1014, 1016, and the computer-readable medium/memory 204. The bus 206 may also link various other circuits such as timing sources, peripherals, voltage regulators, and power management circuits, which are well known in the art, and therefore, will not be described any further.

The processing system 200 may be coupled to a receiver 120. The receiver 120 is coupled to one or more antennas 110. The receiver 120 provides a means for communicating with various other apparatus over a transmission medium. The receiver 120 receives a signal from the one or more antennas 110, extracts information from the received signal, and provides the extracted information to the processing system 200. In addition, the receiver 120 receives information from the processing system 200. The processing system 200 includes a processor 202 coupled to a computer-readable medium/memory 204. The processor 202 is responsible for general processing, including the execution of software stored on the computer-readable medium/memory 204. The software, when executed by the processor 202, causes the processing system 200 to perform the various functions described supra for any particular apparatus. The computer-readable medium/memory 204 may also be used for storing data that is manipulated by the processor 202 when executing software. The processing system 200 further includes at least one of the components 1002, 1004, 1006, 1008, 1010, 1012, 1014, 1016. The components may be software components running in the processor 202, resident/stored in the computer readable medium/memory 204, one or more hardware components coupled to the processor 202, or some combination thereof.

Specifically, the processing system 200 includes the resolving component 1002, the constructing component 1004, the adjusting component 1006, the first comparing component 1008, the calculating component 1010, the second comparing component 1012, the determining component 1014 and the alarming component 1016.

The resolving component 1002 is used to resolve the whole-cycle ambiguity, using the geometry-free and ionosphere-free combination of multiple frequencies. The constructing component 1004 is used to construct geometry-free and ionospheric amplification type detection statistics. The adjusting component 1006 is used to adjust a detection threshold based on a required monitoring false alarm rate. The first comparing component 1008 compares the detection statistics and the detection threshold; if the detection statistics is more than the detection threshold, the alarming component 1016 issues alarm. If not, the calculating component 1010 calculates the miss-detection rate of the ionosphere gradient of 300 mm/km. The second comparing component 1012 compares the calculated miss-detection rate and a required miss-detection rate. If the calculated miss-detection rate is more than a required miss-detection rate, the alarming component 1016 issues alarm. If not, the determining component 1014 determines the ionosphere gradient as normal.

From the foregoing, it will be appreciated that, although specific embodiments of the invention have been described herein for the purposes of illustration, various modifications may be made without deviating from the spirit and scope of the invention. Accordingly, I claim all steps and modifications as many come within the scope and spirit of the following claims.

What is claimed is:

1. An integrity monitoring method of ionosphere gradient, comprising,
   step 1, obtaining original Navigation Satellite System triple-frequency carrier phase observations by a receiver; and constructing geometry-free and ionospheric amplification detection statistics by a processor of a processing system, based on the original Navigation Satellite System triple-frequency carrier phase observations, wherein the receiver is coupled to one or more antennas; the receiver receives a signal from the one or more antennas, extracts information from the received signal, and provides the extracted information to the processing system, wherein the detection statistics are obtained from the equation (1)

$$q^{i,j} = \sum_{f=1}^{3}\alpha_f \Delta\nabla\phi_f^{i,j} = \sum_{f=1}^{3}\lambda_f\alpha_f \Delta\nabla N_f^{i,j} + \sum_{f=1}^{3}\mu_f\alpha_f \Delta\nabla I_1^{i,j} + \varepsilon, \quad (1)$$

$$\text{s.t.} \sum_{f=1}^{3}\alpha_f = 0, \max\sum_{f=1}^{3}|\mu_f\alpha_f|, \min\left(\sum_{f=1}^{3}\alpha_f^2\right)$$

where, q represents the detection statistics, $\Delta\nabla\phi$ represents double-difference carrier-phase observations, a represents a combination coefficient, $\lambda$ represents a wavelength, $\mu$ represents a ionospheric scale factor, $\Delta\nabla N$ represents a whole-cycle ambiguity, $\Delta\nabla I$ 1 represents a double-difference ionospheric residual on the frequency point of BeiDou B1, $\varepsilon$ represents an observation noise, f represents a frequency point of the Navigation Satellite System, and i and j represent corresponding satellites, and the selection of the combination coefficient satisfy the following constraints:

1): geometry-free combination $$\sum_{f=1}^{3}\alpha_f = 0;$$

2): a delay coefficient of the ionosphere reaches a maximum value to improve a detection sensitivity of a ionosphere gradient anomalies; and 3): a noise amplification coefficient is small enough to minimize the demand for a initialization time step 2, adjusting, executed by the processor, a detection threshold based on a required monitoring false alarm rate, and determining whether the detection statistics are less than the adjusted detection threshold, step 3, comparing, executed by the processor, a calculated miss-detection rate and a required miss-detection rate, and determining whether the calculated miss-detection rate is less than the required miss-detection rate, and step 4, if the detection statistics are less than the adjusted detection threshold and the calculated miss-detection rate are less than the required miss-detection rate, considering the ionosphere gradient is normal, wherein the processing system comprises a bus architecture comprising a number of interconnecting buses and bridges linking together a plurality of circuits comprising at least the processor wherein when the detection statistics of a pair of satellites exceeds a detection threshold, sending out alarm, by the processor.

2. The method of claim 1, wherein, in step 2, adjusting a detection threshold based on the equation (2), $$P_{FA} = P\{|q| > T|H_0, CF\}P\{CF\} + \sum_{i=1}^{N_{fa}}P\{|q| > T|H_0, IF_i\}P\{IF_i\} \quad (2)$$

where, $P_{FA}$ represents requirements for the false alarm rate, T represents a detection threshold, $H_0$ represents that satellites are in a normal state, CF represents that a resolution of ambiguity is correct, $IF_i$ represents the resolution of ambiguity deviates ±i cycles from a true value, and $N_{fa}$ is failure modes of the resolution of the whole-cycle ambiguity that are obtained based on requirements of a calculation accuracy of the false alarm rate.

3. The method of claim 2, wherein, in step 3, the calculated miss-detection rate is calculated based on the equation (3), $$P_{md} = P\{|q| < T|H_1, CF\}P\{CF\} + \sum_{i=1}^{N_{md}}P\{|q| < T|H_1, IF_i\}P\{IF_i\} \quad (3)$$

where, $H_1$ represents that satellites are in an abnormal state, $N_{md}$ is failure modes of the resolution of the whole-cycle ambiguity that are obtained based on requirements of the calculation accuracy of the miss-detection rate, and the required miss-detection rate is obtained from Markov Model.

* * * * *